United States Patent [19]
Wokan et al.

[11] Patent Number: 4,850,320
[45] Date of Patent: Jul. 25, 1989

[54] ELECTRICAL GAS PEDAL

[75] Inventors: Andreas Wokan, Darmstadt; Gerald Helmstädter, Weiterstadt; Kurt Probst, Schwalbach, all of Fed. Rep. of Germany

[73] Assignee: VDO Adolf Schindling AG, Frankfurt am Main, Fed. Rep. of Germany

[21] Appl. No.: 193,898

[22] Filed: May 13, 1988

[30] Foreign Application Priority Data

Jul. 9, 1987 [DE] Fed. Rep. of Germany ....... 3722633

[51] Int. Cl.⁴ ..................... F02D 31/00; F02D 45/00
[52] U.S. Cl. ..................................... 123/365; 123/359
[58] Field of Search ............... 123/179 L, 198 D, 358, 123/359, 365, 479

[56] References Cited

U.S. PATENT DOCUMENTS

| | | | |
|---|---|---|---|
| 4,509,480 | 4/1985 | Kull et al. | 123/359 |
| 4,515,125 | 5/1985 | Buck et al. | 123/359 |
| 4,528,952 | 7/1985 | Flaig et al. | 123/198 D X |
| 4,534,328 | 8/1985 | Fischer et al. | 123/359 |
| 4,566,414 | 1/1986 | Sieber | 123/365 X |
| 4,750,463 | 6/1988 | Peter et al. | 123/365 X |
| 4,785,781 | 11/1988 | Pfalzgraf | 123/198 D X |

*Primary Examiner*—Willis R. Wolfe
*Attorney, Agent, or Firm*—Martin A. Farber

[57] ABSTRACT

The safety monitoring of an electrical gas-pedal system having a desired-value transmitter (2), a controller unit (3), a controlling element (4) and safety contacts (8 and 9 respectively) associated with the desired-value transmitter and the controlling element includes the possibility of checking the safety contact (9) of the controlling element even if, as a result of an increased idling-speed-of-rotation control position or a mechanical limitation, the control position of the controlling element lies above the switch point of the safety contact. For this purpose, when the engine speed of rotation exceeds a given threshold value (ns) which results from the increased idling speed of rotation plus a safety margin, in the absence of a corresponding signal from the desired-value transmitter push operation is recognized by the controller unit (3), and the controlling element (3) is moved back to such an extent that the safety contact (9) must have switched. If a switching of the safety contact (9) does not take place then an error response is brought about.

2 Claims, 2 Drawing Sheets

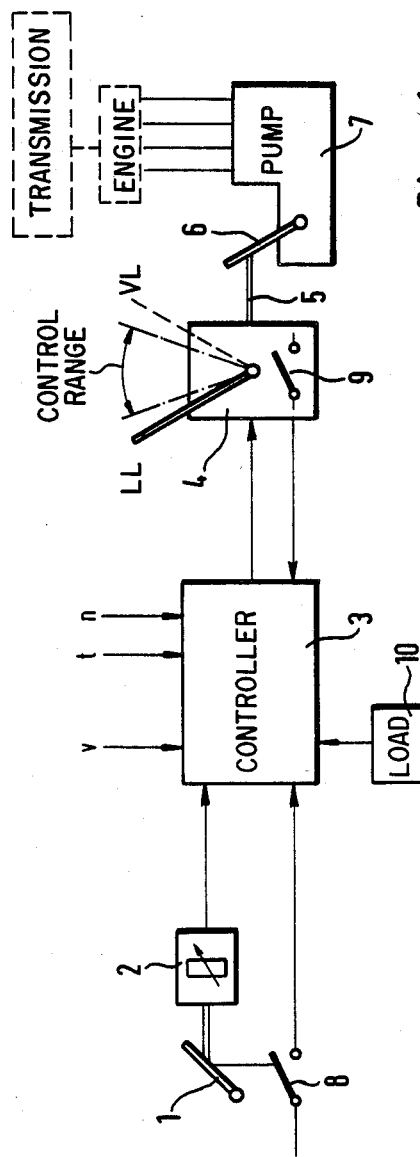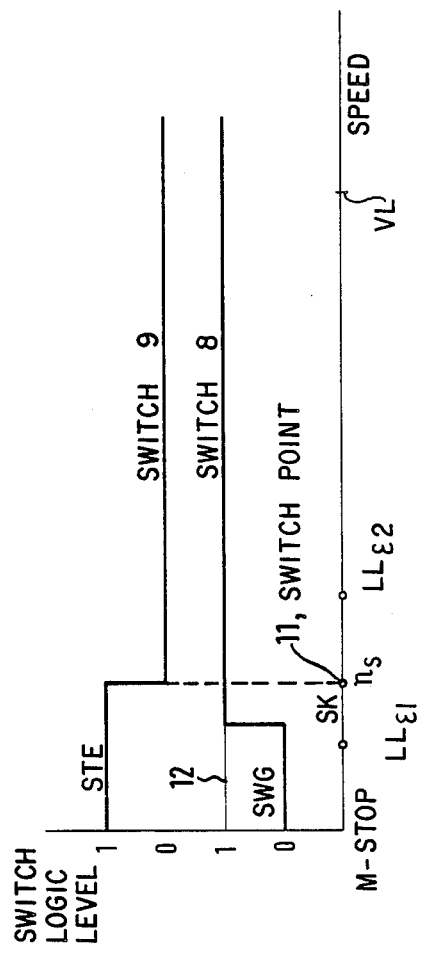

ELECTRICAL GAS PEDAL

FIELD AND BACKGROUND OF THE INVENTION

The invention relates to an electrical gas pedal.

In particular, it relates to an electrical gas pedal for automotive vehicles having a desired-value transmitter from which an electric desired-value signal can be fed to an electronic controller unit with speed-of-rotation measurement, with a controlling element which can be controlled by electric signals of the controller unit and can be displaced within a maximum possible desired setting range limited by first and second end positions, by which controlling element, via a transmission unit, a displacement device which is displaceable in an actual-place range which is limited by a first and a second end position can be mechanically actuated to control the engine output, having at least one additional controlling unit for increasing the idling speed of rotation, with a desired-value-transmitter safety contact which closes after a given path of displacement of the desired-value transmitter, and with a controlling-element safety contact which opens after a given adjustment path of the controlling element, and with a safety-contact monitoring circuit which monitors the manner of operation of the safety contacts and, in the event of an error on the part of one of the safety contacts, triggers an error reaction.

In one known system of this type, the safety contacts are so adjusted, in order to permit as early as possible a recognition of errors, that they switch already upon the smallest possible displacement paths. By increasing of the idling speed of rotation as a function of certain factors, such as, for instance, the temperature of the engine at low temperatures, or on basis of the switching on of additional load consumers such as, for instance, an air conditioner, the idling speed control position lies above the switch point of the controlling-element safety contact. When the desired-value transmitter is not actuated and when, therefore, an idling desired-value transmitter signal is present, both safety contacts are unactuated and the safety circuit would respond. In such a case, proper operation of the internal combustion engine would not be possible. This occurs, for instance, in internal combustion engines having injection pumps with separate engine stop. In the case of internal combustion engine having injection pumps with engine stop via an injection pump lever, the position of the controlling element when the engine stop function is not actuated lies in a position above the switch point of the controlling-element safety contact upon an increase in the idling speed of rotation as a result of the above-indicated factors or in the event of a large limiting of the adjustment range. When the desired-value transmitter is not actuated, both switch contacts again are unactuated, i.e. they are disconnected and the safety circuit responds again.

The result hereof is, once again, that, due to the error reaction of the safety circuit operation of the internal combustion engine, in the case of an increase of the idling speed of rotation above the switch point of the controlling-element safety contacts as a result of additional loads or as a function of the temperature of the engine, operation of the internal combustion engine is always impossible when the signal of the desired-value transmitter corresponds to a desired value which lies below the switch contact of the desired-value transmitter safety contact.

SUMMARY OF THE INVENTION

It is an object of the invention to make operation of the internal combustion engine possible within all operating ranges and to assure a safety monitoring of the safety contacts despite the limiting of the setting range or the increase in the idling speed of rotation above the switch point.

Accordingly, by the invention, in case of the presence of an increase in the idling speed of rotation, the controller unit (3) bridges over the desired-value-transmitter safety contact (8) up to a speed-of-rotation threshold value (ns) and, at a speed of rotation above this, does away with the bridging (12) and in the case of the exceeding of this threshold value (ns) and the absence of a correspondingly associated desired-value transmitter signal, the controller unit (3) moves the controlling element (4) back into a position in which the controlling element safety contact (9) must be switched.

By this formation, assurance is had that, even upon a limiting of the setting range which is effected for the reasons set forth above, an error response coming from the safety circuit is avoided.

The basic idea of the present invention consists essentially in the bridging over the safety contacts up to a threshold value of the speed of rotation which lies above the desired value of the idling speed of rotation control, increased by a slight safety margin, in the operating conditions under which an error reaction would occur in the previously known development, so that the safety circuit does not trigger an error reaction. At speeds which lie above this threshold value and which are noted by the controller unit, the checking of the safety contact of the controlling element is effected when a desired-value transmitter signal is present corresponding to the idling speed of rotation and therefore at an engine speed of rotation which is actually higher than corresponds to the safety contact. For this purpose, the controlling element is briefly returned by the controller unit to such an extent back along its displacement path that the safety contact must have switched. This is customarily possible in pushing operation, but can also be carried out when the injection-pump lever is moved into the engine stop position as the result of an actuation of the engine-off key.

In order to prevent a stalling of the engine in the case of engines with engine stop via injection-pump lever, which would lead to a considerable impairment in safety in the case of vehicles with power-booster-units say, for instance, if power steering and brakes were to fail, in a further development of the invention the controller unit (3) prevents a return of the controlling element (4) by the control at engine speeds of rotation which are only slightly above the idling speed of rotation but are below the threshold value (ns1) and at speeds of rotation above this permits only a brief return by the control.

BRIEF DESCRIPTION OF THE DRAWINGS

With the above and other objects and advantages in view, the present invention will become more clearly understood in connection with the detailed description of a preferred embodiment, when considered with the accompanying drawings, of which:

FIG. 1 is a block circuit diagram;

FIG. 2 is a diagram showing the manner of operation of the safety contacts; and

DETAILED DESCRIPTION OF THE PREFERRED EMBODIMENT

Figure 3:
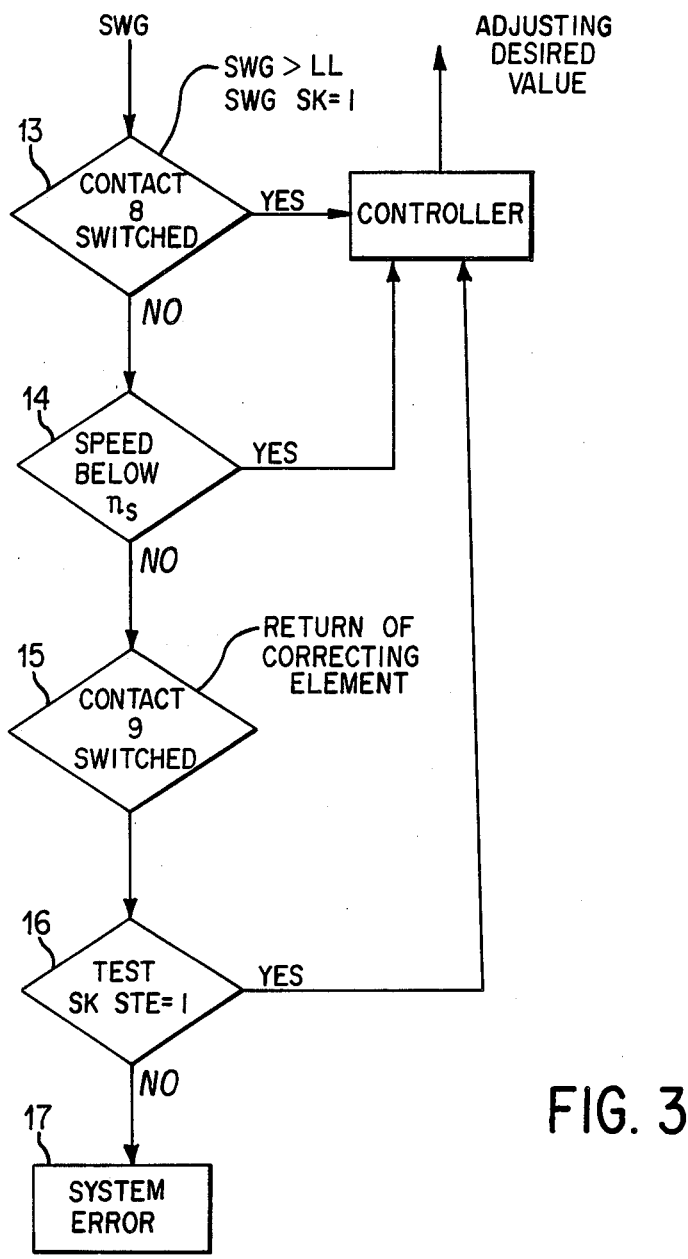
FIG. 3 is a flowchart of the function logic.

As seen in FIG. 1, the overall arrangement comprises a gas pedal 1, a desired-value transmitter 2, a controller unit 3 comprising multiple controller functions, a controlling element 4, a transfer unit 5, a displacement device 6 of an injection pump 7, a safety contact 8 of the desired-value transmitter which can be actuated by the gas pedal 1, and a safety contact 9 which can be actuated by the controlling element 4. The controller unit 3 comprises various additional functions and is capable of shifting the position of the controlling element 4, for instance upon a cold start, on basis of a desired speed of an automatic temperature device or as a function of an additional load 10 by increasing the idling speed of rotation, as a result of which it can possibly lie above the safety control switch point.

In order fully to assure the inherent security of the system, for instance upon a short circuit, the safety contacts 8 and 9 are provided. The safety contact 8, which is associated with the desired-value transmitter, closes after a given displacement path, i.e. at a given angular position of the gas pedal and therefore at a given desired-value position. The safety contact 9, which operates as a function of the displacement path of the controlling element and therefore as a function of the angular position of the controlling element 4, is closed commencing from the stop up to its switch point, designated 11 in FIG. 2, and opens upon further displacement of the controlling element beyond this switch point. Both switches perform an "OR operation" and have the result that a command from the controller unit 3 is only transmitted to the controlling element when one of the two safety contacts is connected.

If now, on basis of a change in control position, the control position for the idling speed of rotation lies above the safety switch point, as is the case when the idling speed of rotation must be increased due to a low engine temperature or additional loads or when a mechanical limitation is present, then no possibility is present for the corresponding safety circuit within the controller unit to check the correct manner of operation of the safety contacts since in this operating state the idling speed control lies above this switch point. This new idling speed control position is designated LLE2 in FIG. 2. With the normal, unrestricted adjustment range or non-increased idling-speed control position, the idling speed of rotation control position would be at a lower value, designated LLE2 in FIG. 2. If now, with a cold engine or due to the connecting of additional units, the required idling speed control position is set above the safety switch point 11 then, with the desired-value transmitter not actuated, both safety contacts would be disconnected and the safety monitoring would lead to a corresponding error response.

In order not to permit this condition to occur, the safety contact is bridged over up to a given threshold value of a speed of rotation which lies above the increased speed of rotation control desired value by a small safety margin, in which connection the controller unit continuously establishes the speed of rotation. This bridging is indicated in FIG. 2 by a thin line 12. If a speed of rotation which lies above this threshold value is measured by the controller unit without a corresponding desired-value signal ns of the desired-value transmitter being present, then this bridging 12 is eliminated and an error is assumed by the safety circuit.

In order to acquire certainty as to whether an error is actually present, one proceeds in accordance with the function logic of FIG. 3.

The monitoring step 13 in accordance with FIG. 3 represents the customary monitoring of the safety contact. In this connection it is determined by the safety circuit whether a desired-value signal from the desired-value transmitter is present and whether the corresponding safety contact has switched, which is shown in the monitoring step 13 by SWGSK=1.

If, upon further testing in accordance with test step 14 it is found that the actual speed of rotation lies below the threshold value designated ns, then the manner of operation will be recognized to be correct and the desired-value signal will be forwarded further to the controller unit for leveling out. On the other hand, if the speed of rotation actually noted lies above the threshold value ns and if no switching of the safety contact 8 has been noted, then a further measure in accordance with testing step 15 is carried out.

This further measure for the carrying out of the safety monitoring consists therein that with an engine speed of rotation lying above the threshold value and in the absence of a corresponding signal from the desired-value transmitter, the controller unit recognizes that there is push operation since the controller unit has regulated down. The controlling element is thereupon returned to a position in which the safety contact 9 must switch. If, in this connection, switching of the safety contact 9 is noted corresponding to the testing step 16, then the desired-value signal is forwarded to the controller unit. If this is not the case then there is an error response, in which connection either an intervention into the transmission or return to the idling speed of rotation can take place. An engine stop function is not carried out here in order not to impair the further manner of operation of servo-units. This step is designated 17 in FIG. 3.

We claim:

1. In an electrical gas pedal system for an automotive vehicle, the vehicle having a desired-value transmitter producing a desired value signal, an electronic controller unit responsive to the desired-value signal and to a speed of rotation measurement, a controlling element, a transmission unit and engine coupled to the transmission unit, displacement device, and a safety monitoring circuit; and wherein the controlling element is controlled by electric signals of the controller unit and is displaceable within a maximum possible desired setting range limited by first and second end positions, the displacement device is mechanically actuated by the controlling element and is displaceable in an actual-place range limited by a first and a second end position to control the engine output, there being means for increasing the engine idling speed of rotation; wherein the desired-value transmitter has a safety switch with contact which closes after a given path of displacement of the desired-value transmitter, the controlling-element has a safety switch with contact which opens after a given adjustment path of the controlling element, and the safety monitoring circuit monitors the manner of operation of the safety contacts to trigger an error reaction in the event of an error on the part of one of the safety contacts; and wherein in the presence of an increase in the idling speed of rotation, the controller unit is operative to provide a bridging over the desired-value-transmitter safety contact up to a speed-of-rotation threshold value and, at a speed of rotation above the threshold value, does away with the bridging; and wherein upon the speed exceeding the threshold value and in the absence of a correspondingly associated desired-value transmitter signal, the controller unit is operative to move the controlling element back into a position in which the controlling element safety contact is switched.

2. A system according to claim 1, wherein the engine has an engine stop via injection-pump lever, and the controller unit is operative further to prevent a return of the controlling element for control of engine speeds of rotation which are only slightly above the idling speed of rotation but are below the threshold value, and permits only a brief return of the control element at higher speeds of rotation.

* * * * *